United States Patent [19]
Ames

[11] Patent Number: 5,471,346
[45] Date of Patent: Nov. 28, 1995

[54] CASEGRAIN TELESCOPE WITH SPHERICAL MIRROR SURFACES

[75] Inventor: Alan J. Ames, Mountain View, Calif.

[73] Assignee: Lockheed Missiles & Space Co., Inc., Sunnyvale, Calif.

[21] Appl. No.: 189,615

[22] Filed: Jan. 31, 1994

Related U.S. Application Data

[63] Continuation of Ser. No. 850,629, Mar. 13, 1992, abandoned.

[51] Int. Cl.$^6$ .......................... G02B 17/00; G02B 21/00
[52] U.S. Cl. ....................... 359/731; 359/364; 359/366; 359/727
[58] Field of Search ..................... 359/731, 730, 359/727, 366, 859, 364, 365, 355, 356, 357, 399

[56] References Cited

U.S. PATENT DOCUMENTS

| | | | |
|---|---|---|---|
| 3,438,695 | 4/1969 | Matsui | 359/731 |
| 3,515,461 | 6/1970 | Casas et al. | 359/731 |
| 3,700,310 | 10/1972 | Rayces | 359/731 |
| 3,711,184 | 1/1973 | Amon et al. | 359/731 |
| 3,811,749 | 5/1974 | Abel | 359/365 |
| 4,714,307 | 12/1987 | Palmer | 359/351 |

FOREIGN PATENT DOCUMENTS

| | | | |
|---|---|---|---|
| 1010755 | 6/1957 | France | 359/731 |
| 382046 | 8/1973 | U.S.S.R. | 359/731 |
| 478279 | 11/1975 | U.S.S.R. | 359/731 |

OTHER PUBLICATIONS

Johnathan Maxwell, *Catadioptric Imaging Systems*, "FIG. 30", p. 58 (1972).

*Primary Examiner*—Loha Ben
*Assistant Examiner*—Thong Nguyen
*Attorney, Agent, or Firm*—John J. Morrissey

[57] ABSTRACT

To develop a design form for a Cassegrain-type telescope with spherical primary and secondary mirrors, which is well-corrected for chromatic aberration as well as for geometrical aberrations including spherical aberration, coma and astigmatism, the designer begins with a "starting design form" for a conventional Cassegrain-type telescope with spherical primary and secondary mirrors, and then modifies the "starting design form" by:

(a) positioning lens elements of a corrector lens group along an optic axis inside the front focal plane of the spherical primary mirror, where the lens elements of the corrector lens group are made of optical materials that enable a desired degree of correction for chromatic aberration to be achieved;

(b) providing a reflective coating on a central portion of the back surface of the rear-most lens element of the corrector lens group, which replaces the secondary mirror of the "starting design form" and becomes the secondary mirror of the telescope;

(c) locating the entrance pupil of the telescope at the front focal plane of the primary mirror so that all chief rays passing from the entrance pupil through the corrector lens group to the primary mirror are substantially parallel to each other after being reflected from the primary mirror; and (d) adjusting surface curvatures of the lens elements of the corrector lens group, and adjusting the spacing between adjacent lens elements of the corrector lens group, so as to correct for geometrical aberrations that significantly affect performance, particularly astigmatism.

11 Claims, 7 Drawing Sheets

FIG_2

FIG_3

FIG_4

TANGENTIAL

FIG_5

SAGITTAL

FIG_6

TANGENTIAL

FIG_7

SAGITTAL

FIG. 4

FIG_9

CASEGRAIN TELESCOPE WITH SPHERICAL MIRROR SURFACES

This application is a continuation of application No. 07/850,629, filed Mar. 13, 1992, now abandoned.

TECHNICAL FIELD

This invention relates generally to the art of telescope design, and more particularly to a technique for designing telescopes of Cassegrain configuration with low distortion for moderate fields of view and with low pupil aberrations.

BACKGROUND ART

As noted by R. Kingslake in *Lens Design Fundamentals*, Academic Press, Inc., 1978, at page 322: "The classical two-mirror systems used in telescopes date from the seventeenth century. They were either of the Gregorian form with a concave parabolic primary mirror and a concave elliptical secondary, or of the Cassegrain form with the same parabolic primary but a convex hyperbolic secondary."

Historically, the telescope invented by Cassegrain in 1672 had a concave paraboloidal primary mirror and a convex hyperboloidal secondary mirror of shorter focal length than the primary mirror. The original telescope of Cassegrain was corrected for spherical aberration, but was not corrected for any of the off-axis geometrical aberrations. However, at the present time, the term "Cassegrain" is often used in a generic sense to designate any two-mirror telescope (i.e., any telescope having a primary mirror and a secondary mirror), regardless of the geometrical configurations of the mirrors. Even an afocal two-mirror telescope (i.e., a telescope for which the initial object distance and the final image distance are both infinite), as first described by Mersenne in 1636, is now often considered to be a special case of a Cassegrain-type telescope.

In 1905, Schwarzschild designed a telescope generally of the Cassegrain-type using oblate ellipsoidal primary and secondary mirrors arranged in a so-called "reverse telephoto" configuration, which provided correction for spherical aberration, coma, astigmatism and field curvature. A description of the Schwarzschild telescope is provided by D. Korsch in *Reflective Optics*, Academic Press, Inc., 1991, at page 169. Another variation on the original Cassegrain telescope design was developed in 1922 by Ritchey and Chrétien, who used weakly hyperboloidal primary and secondary mirrors in order to achieve correction for coma. The Ritchey-Chrétien telescope is discussed by R. Kingslake in *Lens Design Fundamentals*, Academic Press, Inc., 1978, at page 323.

It was noted by A. E. Conrady in an article entitled "*Optical Systems with Non-spherical Surfaces*", Monthly Notices of the Royal Astronomical Society, January 1920, page 320, that: "For the simple reason that the natural tendency of the abrading processes used in the finishing of optical elements is to produce true spherical surfaces and that deliberate departures from this form greatly increase the difficulty and cost of production, the use of 'figured' [i.e., non-spherical] surfaces has been avoided as far as possible in the wholesale manufacture of optical instruments, the perfection of all of which depends largely, or more often absolutely, upon the skillful compensation of antagonistic spherical aberrations at successive strictly spherical surfaces." The formidable technical difficulties and the high cost involved in manufacturing accurate non-spherical conicoid mirror surfaces has stimulated efforts to develop designs for telescopes using spherical primary and secondary mirrors in combination with refractive elements (i.e., lenses) to obtain correction for chromatic aberration and for the various geometrical aberrations.

In 1932, Schmidt designed a telescope comprising a single mirror of spherical configuration and an aspheric lens (called a "corrector plate") positioned perpendicular to the optic axis of the mirror. The corrector plate of the Schmidt telescope functions like the refractive portion of a Mangin mirror in correcting for spherical aberration. The Schmidt telescope is well-corrected for astigmatism, since the corrector plate defines the aperture of the telescope at the center of curvature of the spherical mirror. The Schmidt telescope is also well-corrected for coma.

The problem of correcting for Petzval curvature in astronomical telescopy was discussed by J. G. Baker in an article entitled "A Family of Flat-Field Cameras, Equivalent in Performance to the Schmidt Camera", Proc of Amer. Phil. Soc., Vol. 82, No. 3, (April 1940), pages 339–349. At that time, the principal difficulty associated with Petzval curvature was the requirement that the photographic plates used in astronomical photography be distorted into spherical surfaces in order to provide high-resolution imaging. Analogous difficulties are now of concern in contemporary instrumentation using large focal plane arrays. Baker drew upon the aforementioned technique of Schwarzschild to produce a flat focal plane, but was unable to correct for astigmatism. The Baker article refers to work by Wright, which indicated that astigmatism cannot easily be eliminated by the use of refractive elements and corrector plates.

In 1941, Maksutov adapted the techniques of Schwarzschild and Schmidt in order to achieve correction for chromatic aberration, spherical aberration, coma and astigmatism in a telescope having concentrically arranged spherical primary and secondary mirrors. The Maksutov telescope comprises meniscus lens elements with spherical surfaces, which provide a small negative optical power. The meniscus lens elements of the Maksutov telescope function in combination with each other in the manner of a Schmidt corrector plate to correct for spherical aberration. A portion of the convex rear surface of one of the meniscus lens element of the Maksutov telescope can be silvered to function as the secondary mirror of the telescope in the manner of a telescope of Schwarzschild design. The aperture of the Maksutov telescope is ordinarily located at the common center of curvature of the primary and secondary mirrors. A description of the Maksutov telescope is found in an article by D. D. Maksutov entitled "New Catadioptric Meniscus Systems", J. Opt. Soc. Am., Vol. 34, No. 5, (May 1944), pages 270–284. The Maksutov telescope is not readily adaptable to a Mersenne-type afocal telescope.

The design of the Maksutov telescope is highly constrained, inasmuch as the primary and secondary mirrors must be concentric in order to achieve the intended corrections for spherical aberration, astigmatism and coma. Variations on the Maksutov telescope, which have been developed to provide better color correction and reduced spherical aberration, are discussed in detail by A. Bouwers in *Achievements in Optics*, Elsevier Publishing Company Inc., (1950), pages 16–45. Telescopes designed by Bouwers are described in U.S. Pat. Nos. 2,420,349; 2,492,461; and 2,748,658. However, the Bouwers telescopes are characterized by the same constraint as the Maksutov telescope, viz., that the spherical primary and secondary mirrors must be concentric in order to correct for coma and astigmatism. The requirement of concentricity for the primary and secondary mirrors is a very significant design constraint, which involves alignment sensitivities that adversely affect manufacturability and cost.

Houghton, in U.S. Pat. No. 2,350,112 granted in 1944, disclosed a single-mirror catadioptric telescope (i.e., not a Cassegrain-type telescope) in which substantially full correction for spherical aberration and coma is achieved by means of a corrector lens system (viz., a doublet) located beyond the focal plane of the single mirror (a spherical mirror) of the telescope. However, Houghton indicated that correction for astigmatism could not be achieved for such a telescope merely by adjusting the configuration and location of the corrector lens system. The Houghton telescope is not readily adaptable to a Mersenne-type afocal telescope.

SUMMARY OF THE INVENTION

It is an object of the present invention to provide a technique for designing telescopes of Cassegrain configuration with spherical primary and secondary mirror surfaces, which produce images that are characterized by low distortion for moderate fields of view.

It is a concomitant object of the present invention to provide design forms (i.e., optical prescriptions) for telescopes of Cassegrain configuration with spherical primary and secondary mirror surfaces, which produce images having low distortion for moderate fields of view for use particularly in tracking applications.

It is a particular object of the present invention to provide a catadioptric telescope of the Cassegrain type with spherical primary and secondary mirror surfaces, which is well-corrected for chromatic aberration and also for geometrical aberrations (viz., spherical aberration, coma and astigmatism), and which is free of any concentricity requirement with respect to the primary and secondary mirror surfaces.

In general, to develop a design form for an optical system that is to be used for a specified application, the designer would ordinarily:

(1) first determine an overall arrangement of reflective and refractive elements appropriate for the system, as suggested by the background art, without regard to optical aberrations; and (2) then adjust geometrical parameters (e.g., radii of curvature, axial thicknesses, and axial spacings between the elements) so as to optimize performance of the system with regard to the particular optical aberrations that significantly affect performance.

In particular, to develop a design form for a Cassegrain-type telescope according to the present invention, which has spherical primary and secondary mirror surfaces, and which is also well-corrected for chromatic aberration and for the geometrical aberrations including spherical aberration, coma and astigmatism, and furthermore which is free of any concentricity requirement with respect to the primary and secondary mirror surfaces, the designer begins with a "starting design form" for a conventional Cassegrain-type telescope—but using spherical primary and secondary mirrors. Then, in accordance with the present invention, the designer:

(a) uses the spherical primary mirror of the "starting design form" as the primary mirror of the new Cassegrain-type telescope that is to be designed, and locates the entrance pupil for the new Cassegrain-type telescope at the front focal plane of the primary mirror;

(b) places a corrector lens group comprising lens elements with spherical surfaces (generally as described in the aforementioned U.S. Pat. No. 2,350,112 to Houghton) inside the front focal plane of the primary mirror;

(c) provides a reflective coating on a central portion of the spherical back surface of the rear-most lens element of the corrector lens group, which now replaces the secondary mirror of the "starting design form" and becomes the secondary mirror of the new Cassegrain-type telescope that is to be designed; and (d) adjusts the spacing between the thusly formed primary and secondary mirrors of the new Cassegrain-type telescope to eliminate astigmatism.

The designer thereby produces an intermediate arrangement of reflective and refractive elements consisting of: (1) the concave spherical mirror of specified focal length, which functions as the primary mirror of the Cassegrain-type telescope to be designed; and (2) the corrector lens group of spherical lens elements, which is located coaxially on the optic axis of the telescope between the primary mirror and the front focal plane of the primary mirror. The central portion of the back surface of the rear-most lens element of the corrector lens group (i.e., the lens element closest to the primary mirror) is silvered to function as the secondary mirror of the telescope, replacing the secondary mirror of the "starting design form".

The intermediate arrangement of reflective and refractive elements is then modified by adjusting the curvatures of the spherical surfaces of the lens elements of the corrector lens group, and by adjusting the spacing between adjacent lens elements, to eliminate any remaining geometrical aberrations that significantly affect performance of the telescope.

The configurations and relative positions of the primary and secondary mirrors of the Cassegrain-type telescope that is to be designed determine such fundamental properties of the telescope as whether the telescope is to be of the focussing kind so as to form a real image, or of the afocal (i.e., Mersenne) kind so as to provide a collimated output. The configurations and relative positions of the primary and secondary mirrors also determine obscuration ratios, f-numbers, and the overall focal length (or afocal magnification) of the telescope. Geometrical parameters of the lens elements of the corrector lens group (i.e., the number of lens elements as well as their configurations and relative positions), on the other hand, determine the degree of correction of the telescope for most of the optical aberrations—with the exception of astigmatism.

In the prior art, the degree of correction of a Cassegrain-type telescope for astigmatism was determined by the arrangement of the lens elements of the corrector lens group in conjunction with the arrangement of the primary and secondary mirrors. It is a feature of the telescope design technique of the present invention, however, that correction for astigmatism is achieved substantially entirely by the arrangement of the primary and secondary mirrors alone without regard to the arrangement of the lens elements of the corrector lens group. The telescope design technique of the present invention effectively separates the functions of the reflecting elements from the functions of the refracting elements in a telescope of the Cassegrain type, so that the reflecting elements (i.e., the primary and secondary mirrors) provide the fundamental optical power and also provide correction for astigmatism, while the refracting elements (i.e., the lens elements of the corrector lens group) provide correction for chromatic aberration, spherical aberration and coma.

The optical aberration ordinarily of greatest significance in telescope design (particularly in telescopes designed to serve in tracking applications) is astigmatism, because third-order astigmatism is proportional to the square of the field angle. The telescope design technique of the present invention recognizes and takes advantage of the effect of the arrangement of the primary and secondary mirrors on the extent of astigmatism in a telescope of Cassegrain configuration. In order for an image formed by a Cassegrain-type telescope to be completely free of astigmatism, the tangential and sagittal focal points of the image must be coincident. The Maksutov telescope achieves a condition that substantially approximates coincident tangential and sagittal focal points for the image by using primary and secondary mirror surfaces that are concentric with the entrance pupil of the telescope. However, in accordance with the present invention, it is not necessary that the primary and secondary mirror surfaces of the telescope be concentric with the telescope entrance pupil in order to achieve correction for astigmatism.

In accordance with the present invention, it is recognized that once an arrangement has been established for the primary (concave) mirror and the secondary (convex) mirror of a Cassegrain-type telescope to provide the desired optical power for the telescope, usually only a minor change in separation between the primary and secondary mirrors is needed in order to obtain adequate correction for third-order astigmatism. Correction for Petzval curvature can be achieved in most cases by providing equal radii of curvature for the primary and secondary mirrors. Using the technique of Baker in which the radii of curvature are equal for the primary and secondary mirrors, astigmatism (particularly third-order astigmatism) can be reduced to a very tolerable extent even if not actually reduced to zero. The amount of separation that can be provided between the primary and secondary mirrors while still obtaining substantial correction for third-order astigmatism can readily be determined by using any one of a variety of well-known methods, e.g., the Coddington equations, the Abbe-Young equations, the Burch plate diagram, or a direct approach based on Seidel calculations using the paraxial ray-tracing equations.

In implementing the present invention, a "starting design form" for a Cassegrain-type telescope is selected in which at least the primary mirror has a concave spherical reflective surface. Then, the designer:

(a) locates a corrector lens group at a position inside the focal plane of the primary mirror of the "starting design form", and (b) provides a reflective coating on a central portion of the rear-most lens element of the corrector lens group to form convex mirror surface, which replaces the secondary mirror of the "starting design form", thereby providing an "intermediate design form". The lens elements of the corrector lens group are made of materials (i.e., optical glasses or other types of optical materials) that are selected so as to enable color-correction of the telescope at a specified number of wavelengths to be achieved. (A technique has been described in U.S. Pat. No. 5,020,889 for selecting optical materials for the lens elements of an optical system so as to make color correction of the optical system possible at a specified number of wavelengths.) The focal length of the telescope in the "intermediate design form" is different from the focal length of the telescope in the "starting design form". Thus, the arrangement of the lens elements of the corrector lens group in the "intermediate design form" must be further adjusted to compensate for this difference in focal length, i.e., to restore the original focal length (or the original afocal condition) of the "starting design form", and also to correct for spherical aberration and coma—which can be accomplished in a manner as described in the aforementioned Houghton patent.

In the case of a focussing telescope, compensation for the change in focal length, as well as correction for spherical aberration and coma, can ordinarily be provided by reconfiguring the corrector lens group in the "intermediate design form" as a lens doublet of modest negative-power, which is positioned near the front focal plane of the primary mirror. In the case of a Mersenne telescope, restoration to an afocal condition, and correction for spherical aberration and coma can ordinarily be provided by reconfiguring the corrector lens group in the "intermediate design form" as a lens doublet of modest positive-power, which is positioned near the front focal plane of the primary mirror. In the special case of a so-called "flat field" focussing telescope (i.e., a telescope that produces an image without Petzval curvature), whose design is attributed to Baker, the lens elements of the corrector lens group in the "intermediate design form" are reconfigured so that the rear-most lens surface on which the secondary mirror is formed has the same radius of curvature as the primary mirror.

It is a further feature of the telescope design technique of the present invention that the entrance pupil of the telescope is located at the front focal plane of the primary mirror in order to achieve a condition of low distortion for moderate fields of view, and also in order to achieve a condition of minimal pupil aberrations. When the telescope aperture is located at the front focal plane of the primary mirror, the chief ray passing from the primary mirror to the secondary mirror is telecentric, and the exit pupil is located at the virtual focus of the secondary mirror.

BEST MODE OF CARRYING OUT THE INVENTION

Figure 1:
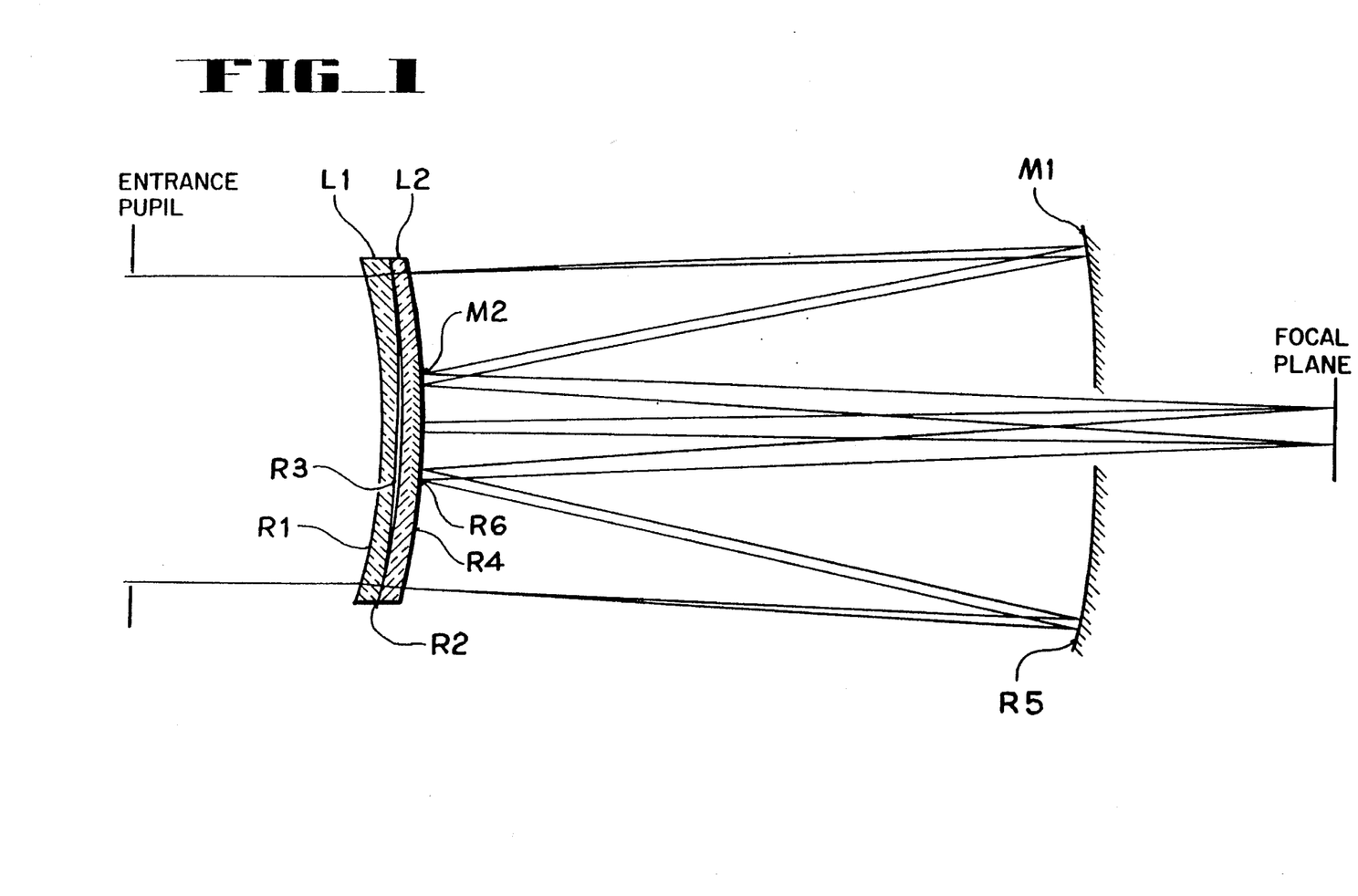
FIG. 1 is a profile view of a focussing telescope of Cassegrain configuration with spherical primary and secondary mirrors according to the present invention.

In FIG. 1, an illustrative embodiment of a focussing telescope of Cassegrain configuration with spherical primary and secondary mirrors according to the present invention is shown in profile view. The telescope of FIG. 1 has a focal length specified as 248.153 mm, and a design form specified in tabular format as follows:

TABLE I

| Surface | | Radius (mm) | Thickness or Separation (mm) | Glass $n_d$ | $V_d$ |
|---|---|---|---|---|---|
| Entrance pupil (25 mm) | | | s = 4.487 | | |
| | $L_1$ { | $R_1 = -51.7405$ | t = 1.000 | 1.51009 | 63.46 |
| | | $R_2 = -148.0587$ | | | |
| | | | s = 0.653 | | |
| | $L_2$ { | $R_3 = -67.5501$ | t = 1.851 | 1.62004 | 36.37 |
| | | $R_4 = -50.0000$ | | | |
| | | | s = 55.365 | | |
| $M_1$ | | $R_5 = -125.0000$ | | | |
| | | | s = 55.365 | | |
| $M_2$ | | $R_6 = R_4 = -50.0000$ | | | |
| Exit pupil | | | (s = −25.000) | | |
| Image | | | s = 100.000 | | |

A beam of parallel light rays entering the telescope of FIG. 1 through the specified entrance pupil passes through the lens elements $L_1$ and $L_2$, which together constitute a negative-power lens doublet corrector. The lens elements $L_1$ and $L_2$ cause the rays to diverge slightly. The diverging rays are collected by the spherical mirror $M_1$, which functions as the primary mirror of the telescope. The primary mirror $M_1$ reflects and converges the rays to the spherical mirror $M_2$, the secondary mirror of the telescope, which is formed on the back surface of the lens element $L_2$. The secondary mirror $M_2$ causes a central obscuration of the beam. Rays reflected from the secondary mirror $M_2$ pass through a central aperture in the primary mirror $M_1$ to a focal plane. The positions of the entrance pupil and the exit pupil are specified so as to minimize distortion of the image formed on the focal plane.

The separation between the primary mirror $M_1$ and the secondary mirror $M_2$ is utilized to provide correction for third-order astigmatism. Seidel coefficients used to adjust the separation between the primary mirror $M_1$ and the secondary mirror $M_2$ are tabulated as follows:

TABLE II

| Surface | Spherical | Coma | Sagittal | Tangential | Distortion |
|---|---|---|---|---|---|
| 1 | 0.0000 | 0.0000 | 0.0000 | 0.0000 | 0.0000 |
| 2 | 0.1182 | −0.0426 | −0.0104 | −0.0070 | 0.0012 |

TABLE II-continued

| Surface | Spherical | Coma | Sagittal | Tangential | Distortion |
|---|---|---|---|---|---|
| 3 | 0.0000 | 0.0000 | 0.0000 | 0.0000 | 0.0000 |
| 4 | −0.3134 | 0.0693 | 0.0031 | −0.0003 | −0.0002 |
| TOTALS | −0.1952 | 0.0267 | −0.0073 | −0.0073 | 0.0010 |

Figure 2:
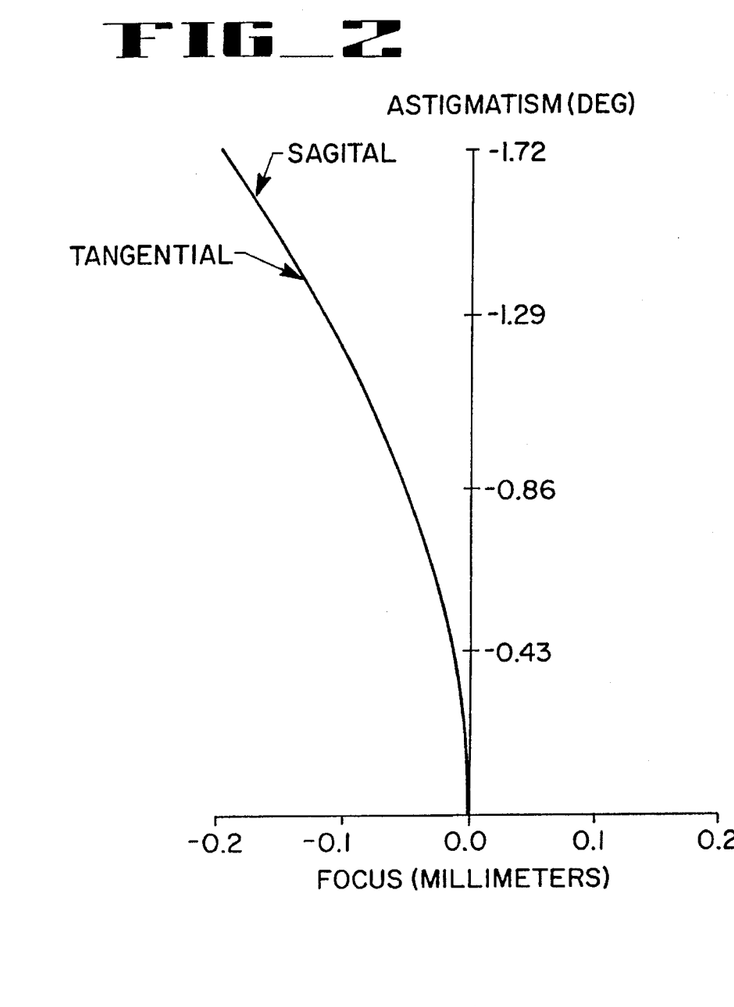
FIG. 2 is a plot of tangential and sagittal astigmatism (which are equal) versus field angle for the telescope of FIG. 1.

The values provided in TABLE II are expressed in millimeters, and are generated using paraxial rays that traverse the separation between the mirrors $M_1$ and $M_2$ from the short conjugate to the long conjugate. Adjustment of the separation between the mirrors $M_1$ and $M_2$ is performed by moving the long conjugate with respect to the short conjugate. Since the sagittal and tangential values are equal, astigmatism is reduced to zero. In FIG. 2, a plot is shown of tangential and sagittal astigmatism (which are equal) versus field angle for the telescope of FIG. 1. The curve in FIG. 2 indicates graphically the condition required for astigmatism to be effectively reduced to zero.

Figure 3:
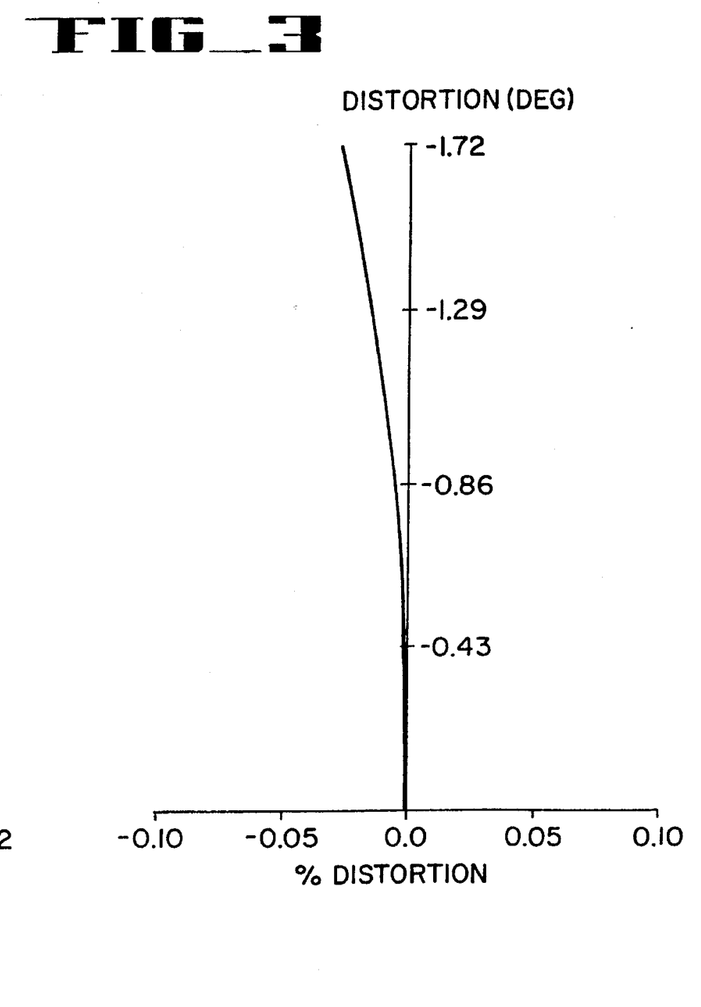
FIG. 3 is a plot of distortion versus field angle for the telescope of FIG. 1.

Since spherical aberration and coma are not affected by adjustment of the separation between the primary mirror $M_1$ and the secondary mirror $M_2$, the configuration and position of the lens doublet corrector (comprising the lens elements $L_1$ and $L_2$) are the relevant parameters. Distortion (i.e., non-uniform lateral magnification over the image field) is minimized by locating the entrance pupil of the telescope at the front focal plane of the primary mirror, which causes the chief ray to be telecentric in passing from the primary mirror to the secondary mirror. Placement of the telescope entrance pupil at the front focal plane of the primary mirror also causes the exit pupil to be located at the virtual focus of the secondary mirror. In FIG. 3, a plot of distortion versus field angle for the telescope of FIG. 1 indicates graphically the condition required for distortion to be insignificant.

Figure 4:
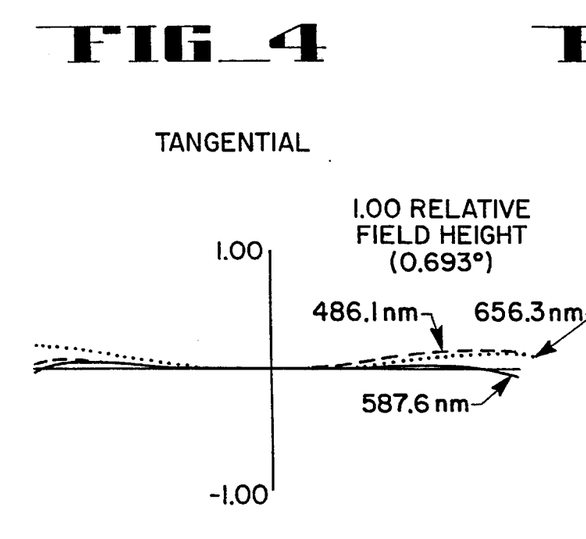
FIG. 4 is a plot of off-axis (0.693°) tangential wavefront error versus relative aperture for the telescope of FIG. 1 at three different wavelengths (viz., 486.1 nm, 587.6 nm, and 656.3 nm).
Figure 5:
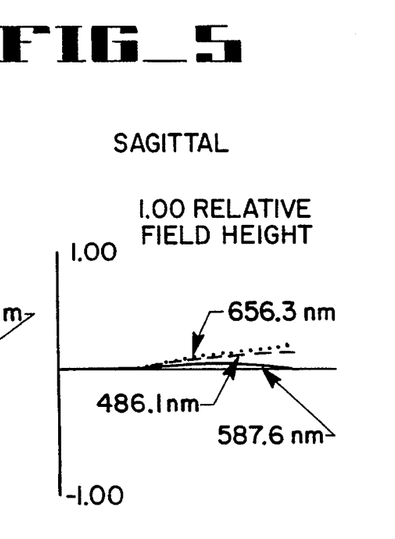
FIG. 5 is a plot of off-axis (0.693°) sagittal wavefront error versus relative aperture for the telescope of FIG. 1 at the same three wavelengths as indicated in FIG. 4.

Overall performance of the focussing telescope illustrated in FIG. 1 is shown by the curves in FIGS. 4, 5, 6 and 7, which indicate that the design form is diffraction-limited and well-corrected for chromatic aberration. FIG. 4 is a plot of off-axis (0.693°) tangential wavefront error versus relative aperture at three different wavelengths (viz., 486.1 nm, 587.6 nm, and 656.3 nm) for the telescope of FIG. 1. FIG. 5 is a plot of off-axis sagittal wavefront error versus relative aperture for the same off-axis angle (viz., 0.693°) versus relative aperture at the same three wavelengths as indicated in FIG. 4 for the telescope of FIG. 1. FIGS. 4 and 5 indicate graphically that polychromatic diffraction-limited performance has been achieved for the telescope of FIG. 1.

Figure 6:
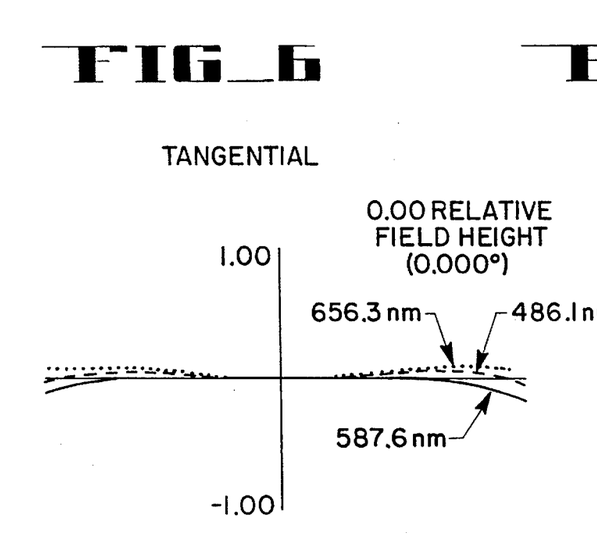
FIG. 6 is a plot of on-axis tangential wavefront error versus relative aperture for the telescope of FIG. 1 at the same three wavelengths as indicated in FIG. 4.
Figure 7:
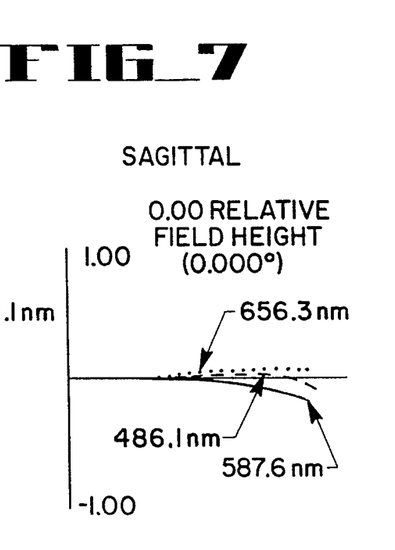
FIG. 7 is a plot of on-axis sagittal wavefront error versus relative aperture for the telescope of FIG. 1 at the same three wavelengths as indicated in FIG. 4.

FIG. 6 is a plot of on-axis tangential wavefront error versus relative aperture at three different wavelengths (viz., 486.1 nm, 587.6 nm, and 656.3 nm) for the telescope of FIG. 1. FIG. 7 is a plot of on-axis sagittal wavefront error versus relative aperture at the same three wavelengths as indicated in FIG. 6 for the telescope of FIG. 1. FIGS. 6 and 7 further indicate graphically that polychromatic diffraction-limited performance has been achieved for the telescope of FIG. 1.

Figure 8:
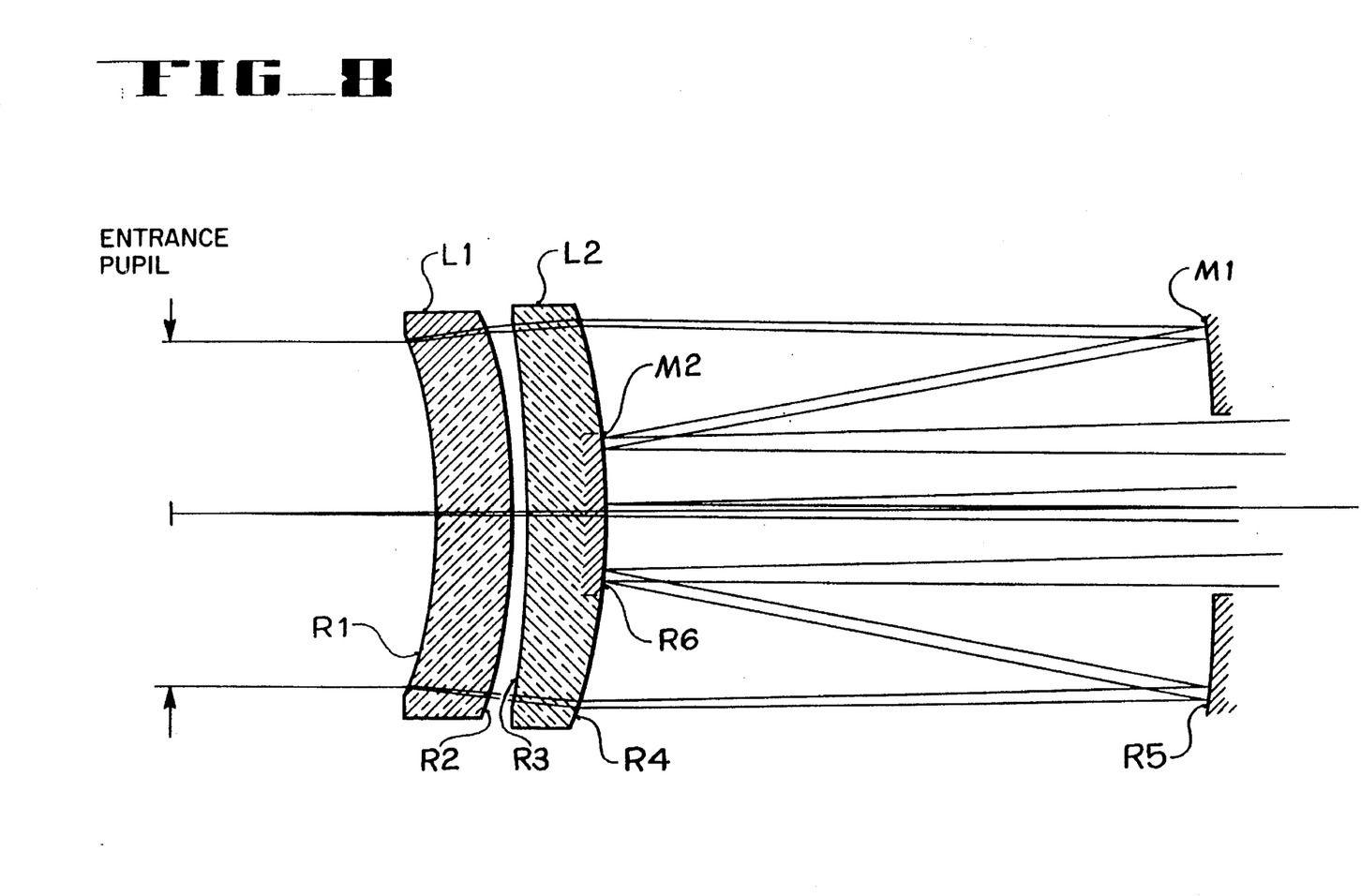
FIG. 8 is a profile view of an afocal (or Mersenne) telescope of Cassegrain configuration with spherical primary and secondary mirrors according to the present invention.

In FIG. 8, an illustrative embodiment of an afocal (or Mersenne) telescope of Cassegrain configuration with spherical primary and secondary mirrors according to the present invention is shown in profile view. The telescope of FIG. 6 is 2.62×afocal (i.e., an output beam is collimated and is reduced in diameter by a factor of 2.62), and has a design form specified in tabular format as follows:

$M_1$ and the secondary mirror $M_2$ provides correction for third-order astigmatism. Data used to adjust the separation between the primary mirror $M_1$ and the entrance pupil in the embodiment of FIG. 8 are tabulated as follows:

TABLE IV

| Surface | Marginal Ray Height | Slope | Chief Ray Height | Slope |
|---|---|---|---|---|
| 1 | 12.5000 | 0.0000 | 0.0000 | 0.0120 |
| 2 | 12.5000 | 0.1319 | 0.2244 | 0.0098 |
| 3 | 13.2066 | 0.0449 | 0.2768 | 0.0123 |
| 4 | 13.2548 | 0.0810 | 0.2900 | 0.0092 |
| 5 | 13.6890 | −0.0186 | 0.3395 | 0.0105 |
| 6 | 12.8955 | 0.1905 | 0.7878 | 0.0000 |
| 7 | 4.7633 | 0.0000 | 0.7878 | 0.0315 |
| 8 | 4.7633 | 0.0000 | 0.0000 | 0.0315 |

The values of marginal ray height and chief ray height provided in TABLE IV are expressed in millimeters, and are generated using paraxial rays from an object at infinity that traverse the separation between the mirrors $M_1$ and $M_2$.

TABLE III

| Surface | | Radius (mm) | Thickness or Separation (mm) | Glass $n_d$ | $V_d$ |
|---|---|---|---|---|---|
| Entrance pupil (25 mm) | | | s = 18.685 | | |
| | $L_1$ | $R_1 = -36.2810$ | t = 5.359 | 1.62004 | 36.37 |
| | | $R_2 = -48.5420$ | s = 1.071 | | |
| | $L_2$ | $R_3 = -87.8614$ | t = 5.359 | 1.51009 | 63.14 |
| | | $R_4 = -50.0000$ | s = 42.681 | | |
| $M_1$ | | $R_5 = -150.0000$ | s = 42.681 | | |
| $M_2$ Exit pupil | | $R_6 = R_4 = -50.0000$ | (s = −25.000) | | |

The design form of the embodiment shown in FIG. 8 differs from the design form of the embodiment shown in FIG. 1 in two particulars. First, the lens elements $L_1$ and $L_2$ comprise a corrector lens group of positive power; and second, an image and corresponding focal plane are not formed. A beam of parallel light rays passing through the lens elements $L_1$ and $L_2$ is caused to converge slightly. The converging rays are collected by the spherical primary mirror $M_1$, which reflects and further converges the rays to the spherical secondary mirror $M_2$. The secondary mirror $M_2$, which is formed on the back surface of the lens element $L_2$, reflects the rays as a parallel beam through a central aperture in the primary mirror $M_1$.

Figure 9:
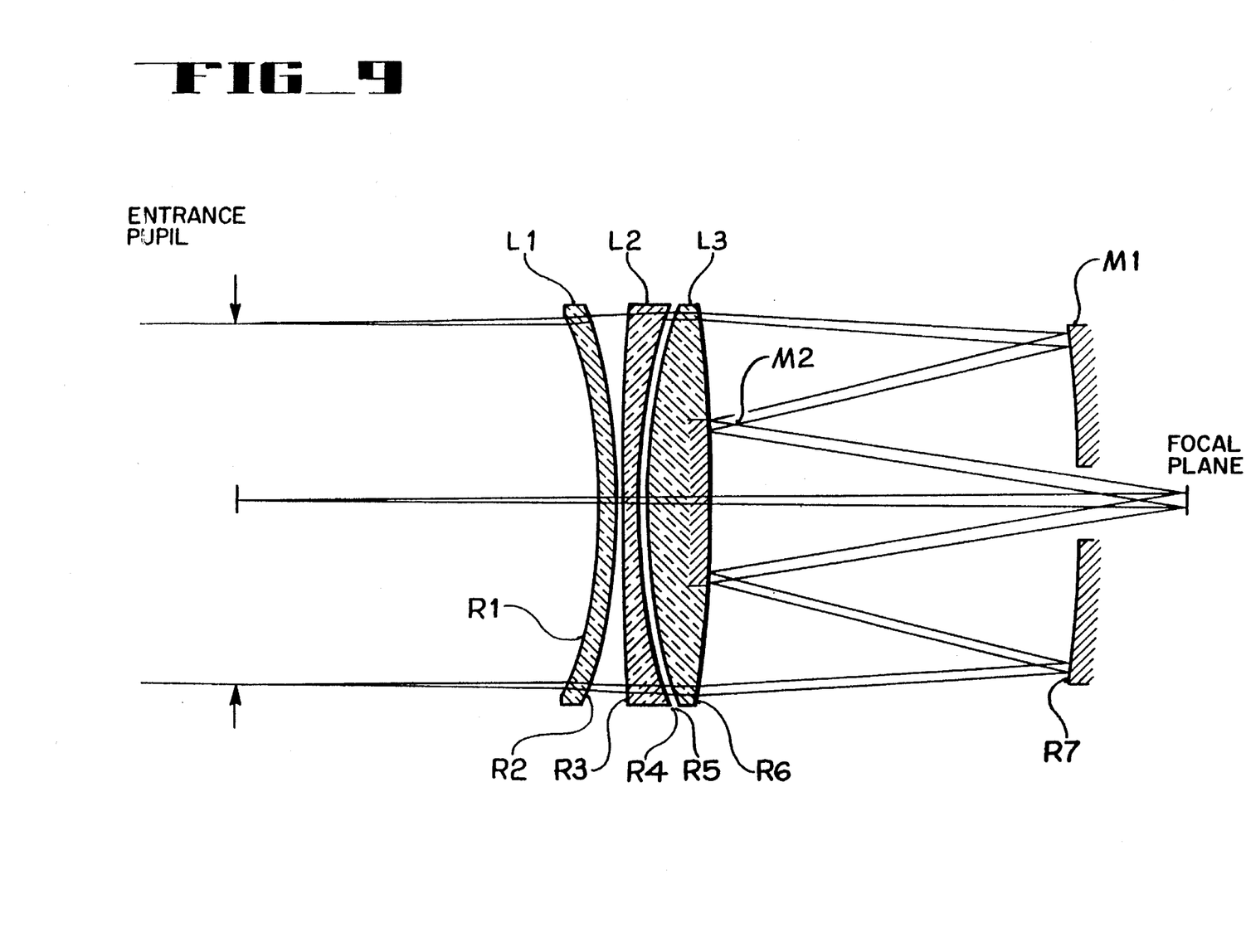
FIG. 9 is a profile view of a "flat field" (or Baker) focussing telescope of Cassegrain configuration with spherical primary and secondary mirrors according to the present invention.

As in the embodiment of FIG. 1, so also in the embodiment of FIG. 8, the separation between the primary mirror In FIG. 9, an illustrative embodiment of a "flat field" (or Baker) telescope of Cassegrain configuration with spherical primary and secondary mirrors according to the present invention is shown in profile view. The telescope of FIG. 9 has a focal length specified as 158.089 mm, and has a design form specified in tabular format as follows:

TABLE V

| Surface | Radius (mm) | Thickness or Separation (mm) | Glass $n_d$ | $V_d$ |
|---|---|---|---|---|
| Entrance pupil (25 mm) | | s = 51.898 | | |

TABLE V-continued

| Surface | | Radius (mm) | Thickness or Separation (mm) | Glass $n_d$ | $V_d$ |
|---|---|---|---|---|---|
| $L_1$ | { | $R_1 = -72.9714$ | $t = 2.000$ | 1.43700 | 90.70 |
| | | $R_2 = -90.5128$ | | | |
| | | | $s = 1.000$ | | |
| $L_2$ | { | $R_3 = 1262.1112$ | $t = 2.000$ | 1.56732 | 42.84 |
| | | $R_4 = 89.9431$ | | | |
| | | | $s = 1.000$ | | |
| $L_3$ | { | $R_5 = 90.2546$ | $t = 8.000$ | 1.62014 | 63.49 |
| | | $R_6 = -250.000$ | | | |
| | | | $s = 1.000$ | | |
| $M_1$ | | $R_7 = -250.000$ | | | |
| | | | $s = 50.000$ | | |
| $M_2$ | | $R_8 = R_6 = -250.000$ | | | |
| Exit pupil | | | $(s = -125.000)$ | | |
| Image | | | $s = 65.217$ | | |

A beam of parallel light rays entering the telescope of FIG. 9 through the specified entrance pupil passes through the lens elements $L_1$, $L_2$ and $L_3$, which together constitute a positive-power lens triplet corrector. The lens elements $L_1$, $L_2$ and $L_3$ cause the rays to converge slightly. A lens triplet is used as the corrector lens group in the embodiment of FIG. 9 (rather than a lens doublet, as in the embodiment of FIG. 1), because a lens doublet cannot provide full correction of coma when the relative aperture as is as large as is required for a "flat field" telescope. The converging rays are collected by the spherical mirror $M_1$, which is the primary mirror, and are reflected thereby to the spherical mirror $M_2$ formed on the spherical back surface of the lens element $L_3$. The spherical mirror $M_2$, which is the secondary mirror, has the same radius of curvature as the primary mirror $M_1$.

The secondary mirror $M_2$ causes a significant central obscuration of the image formed on the focal plane. Full correction of astigmatism would require the reflecting surfaces of the mirrors $M_1$ and $M_2$ to be coincident. Nevertheless, for many applications requiring a "flat field" image, a certain amount of central obscuration and a certain degree of astigmatism can be tolerated. The "flat field" telescope shown in FIG. 9 can provide adequate performance for certain applications. A measure of performance of the "flat field" telescope of FIG. 9 can be obtained by plotting the "Modulation Transfer Function" (MTF) versus spatial frequency. The large central obscuration caused by the secondary mirror $M_2$ of the "flat field" telescope of FIG. 9 renders other methods of evaluating performance difficult to interpret.

Figure 10:
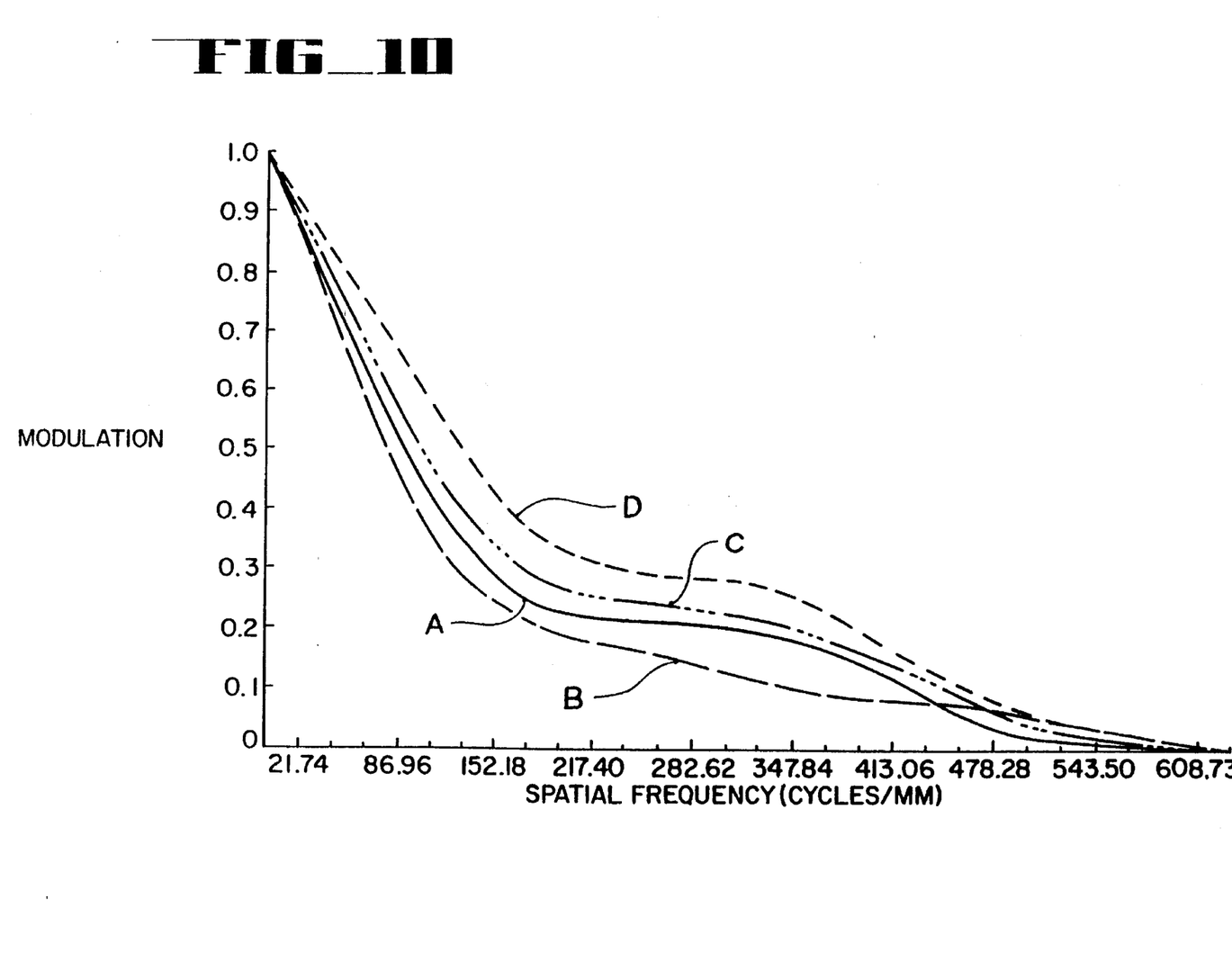
FIG. 10 is a plot of the polychromatic modulation transfer function (MTF) versus spatial frequency in the image plane for the telescope of FIG. 9, which indicates graphically that astigmatism (although not reducible to zero) is substantially reduced and balanced with on-axis MTF performance.

In FIG. 10, the solid-line curve labelled "A" indicates the variation of the MTF with spatial frequency in the image plane for on-axis rays passing through the "flat field" telescope shown in FIG. 9. The broken-line curve labelled "B" in FIG. 10 indicates the variation of the MTF with spatial frequency in the image plane for rays that focus in the tangential plane; and the line labelled "C" in FIG. 10 with dotted and dashed portions indicates the variation of the MTF with spatial frequency in the image plane for rays that focus in the sagittal (i.e., the radial) plane. The dotted-line curve labelled "D" in FIG. 10 indicates the variation of the MTF with spatial frequency in the image plane for on-axis rays passing through an ideal aberration-free optical system having the same aperture diameter and focal ratio as the "flat field" telescope shown in FIG. 9. Curve "D" represents a theoretical diffraction-limited optical system in which performance is optimum. A comparison of curve "A" with curve "D" provides an indication of the extent to which actual performance of the "flat field" telescope shown in FIG. 9 approximates diffraction-limited performance over the indicated spatial frequency range.

Figure 11:
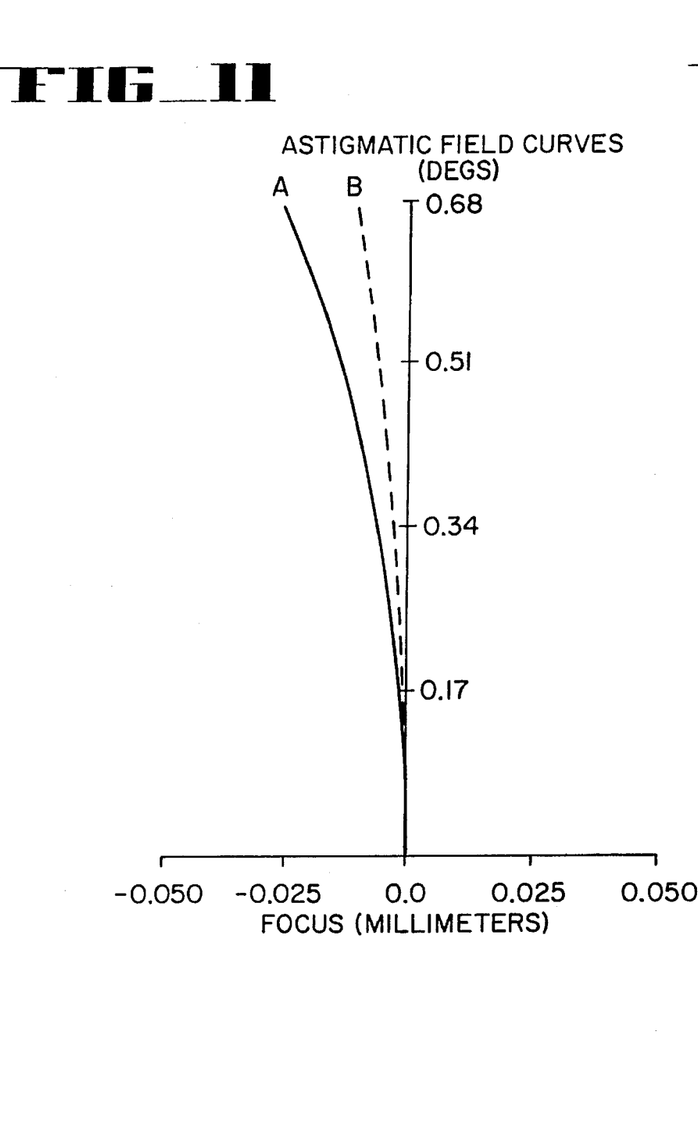
FIG. 11 is a plot of tangential and sagittal astigmatism versus field angle for the "flat field" telescope of FIG. 9.

In FIG. 11, the solid-line curve labelled "A" is a plot of tangential astigmatism with respect to field angle, and the broken-line curve labelled "B" is a plot of sagittal astigmatism with respect to field angle, for the "flat field" telescope shown in FIG. 9. Curves "A" and "B" in FIG. 11 provide a measure of focal shift due to astigmatism, and indicate that some astigmatism remains in the "flat field" telescope of FIG. 9, and that some field curvature has been introduced by the corrector lens group. However, the remaining astigmatism and the field curvature are of the same order of magnitude as the depth of focus, and hence do not degrade the imaging obtainable by the "flat field" telescope of FIG. 9 to any substantial extent.

Figure 12:
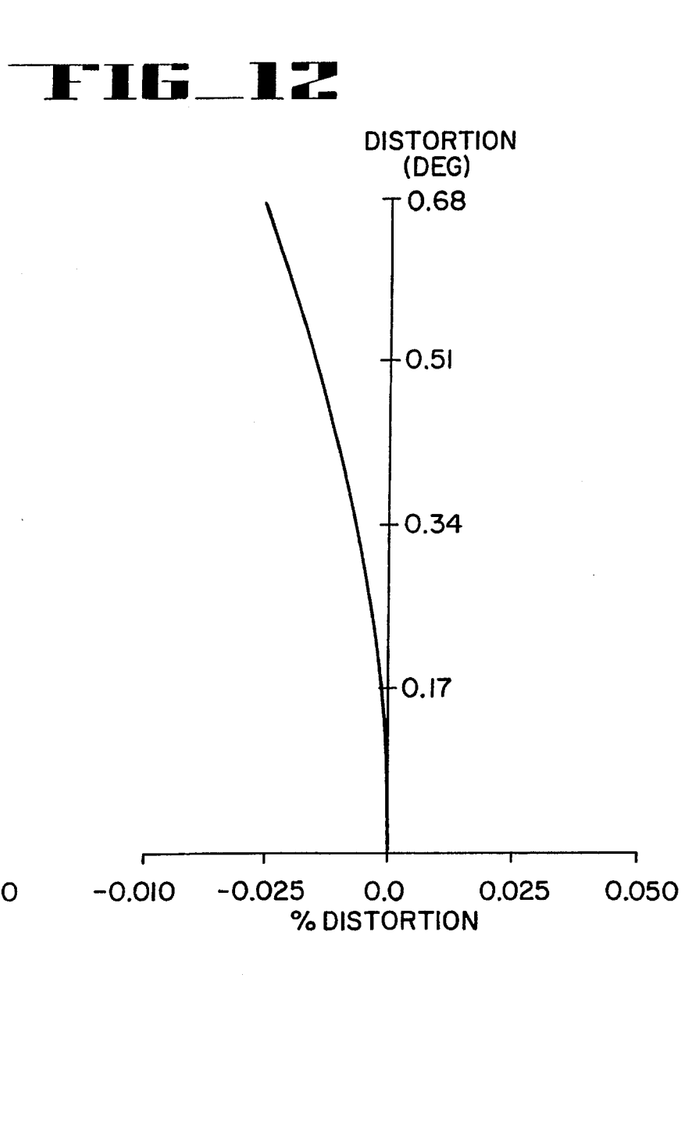
FIG. 12 is a plot of percentage distortion versus field angle for the "flat field" telescope of FIG. 9.

Image distortion is defined as an error in placement of an image with respect to an ideal optical sensor having no optical aberrations. The curve shown in FIG. 12, which is a plot of percentage distortion with respect to field angle for the "flat field" telescope shown in FIG. 9, indicates that an exceptionally low level of distortion is achieved by the "flat field" telescope of FIG. 9.

Indices of refraction for optically refractive media (relative to an absolute reference value of 1.0 for a vacuum) are generally stated with respect to standard atmospheric conditions. The index of refraction of air varies with temperature and pressure, although even extreme variations of temperature and/or pressure generally result in only slight changes in the index of refraction of air from the absolute reference value. Nevertheless, in certain applications for a telescope according to the present invention, particularly in tracking applications over a range that includes endoatmospheric and exoatmospheric segments, even a slight difference between the index of refraction of the atmosphere and the index of refraction of space could result in significant defocussing with consequent blurring of the image. However, correction for defocussing (as well as for chromatic aberration) can be achieved by an appropriate choice of optical materials for the lens elements of the telescope.

The low image distortion achievable with a telescope according to the present invention makes uniform detector spacing on the image plane possible without requiring correction algorithms, which thus minimizes detector cost and maximizes processing speed. It is not necessary that the spherical primary and secondary mirror surfaces be concentric with the entrance pupil, thus permitting a telescope according to the present invention to be more compact (and hence lighter) than would be the case if the mirror surfaces were required to be concentric with the entrance pupil.

The present invention has been described above in terms of particular embodiments. However, other embodiments within the scope of the invention would become apparent to practitioners skilled in the art of optical design upon perusal of the foregoing specification and accompanying drawing. Accordingly, the invention is defined more generally by the following claims and their equivalents.

I claim:

1. A method for designing a telescope of the Cassegrain type having spherical primary and secondary mirrors and also having a plurality of lens elements functioning as a corrector lens group, said method being characterized in that:

(A) a specified optical power for said telescope and correction for astigmatism of said mirrors are provided primarily by determining relative positions of said mirrors said relative positions of said mirrors being substantially independent of relative positions of the lens elements of said corrector lens group, and (B) correction for other geometrical aberrations of said telescope is provided primarily by said corrector lens group, said method comprising the steps of:

a) selecting a design form for a conventional Cassegrain-type telescope having a concave spherical primary mirror and a convex spherical secondary mirror, said primary and secondary mirrors of said conventional Cassegrain-type telescope being coaxially disposed with respect to each other along an optic axis, said concave spherical primary mirror of said conventional Cassegrain-type telescope having a specified focal length defining a front focal plane of said primary mirror, said primary and secondary mirrors of said conventional Cassegrain-type telescope providing said specified optical power, said design form for said conventional Cassegrain-type telescope serving as a "starting design form" with which to begin designing said telescope;

b) locating an entrance pupil for said telescope at said front focal plane of said concave primary mirror of said conventional Cassegrain-type telescope in said "starting design form";

c) developing an "intermediate design form" for said telescope by:

(i) positioning a plurality of lens elements coaxially with respect to each other along said optic axis in said "starting design form", said plurality of lens elements in combination with each other having negligable optical power, said lens elements functioning as said corrector lens group, all refractive surfaces of said lens elements of said corrector lens group being spherical surfaces;

(ii) removing said secondary mirror of said conventional Cassegrain-type telescope from said "starting design form"; and (iii) providing a reflective coating on a central portion of a refractive surface of the lens element of said corrector lens group that is closest to said concave primary mirror in said "starting design form" so that said reflective coating faces said concave primary mirror, said reflective coating replacing said secondary mirror of said conventional Cassegrain-type telescope that has been removed from said "starting design form", said reflective coating functioning as a secondary mirror for said telescope, said concave primary mirror together with said collector lens group and said reflective coating serving as optical elements of said "intermediate design form";

d) adjusting separation between said concave primary mirror and said secondary mirror along said optic axis in said "intermediate design form" so as to provide correction for astigmatism of said mirrors, adjustment of the separation between said primary mirror and said secondary mirror introducing a change in optical power for said telescope in said "intermediate design form"; and e) adjusting geometrical parameters of said corrector lens group in said "intermediate design form" so as:

(i) to restore said specified optical power for said telescope, and (ii) to correct for other geometrical aberrations of said telescope.

2. The method of claim 1 wherein the step of positioning said plurality of lens elements coaxially with respect to said concave primary mirror along said optic axis to function as a corrector lens group for said telescope comprises positioning a lens doublet so as to function as said corrector lens group.

3. The method of claim 1 wherein the step of positioning said plurality of lens elements coaxially with respect to said concave primary mirror along said optic axis to function as a corrector lens group for said telescope comprises positioning a lens triplet so as to function as said corrector lens group.

4. The method of claim 1 wherein the step of positioning said plurality of lens elements coaxially with respect to said concave primary mirror alone said optic axis to function as said corrector lens group comprises selecting a combination of optical materials for said lens elements, said optical materials in combination with each other enabling a specified degree of correction for chromatic aberration for said telescope to be achieved.

5. The method of claim 1 wherein the step of positioning said plurality of lens elements coaxially with respect to said primary mirror along said optic axis to function as said corrector lens group comprises positioning all of said lens elements functioning as said corrector lens group between said entrance group and said concave primary mirror.

6. The method of claim 1 wherein the refractive surface of the lens element of said corrector lens group on which said reflective coating is provided is convex.

7. The method of claim 1 wherein the step of adjusting geometrical parameters of said corrector lens group in said "intermediate design form" comprises adjusting axial thicknesses and curvatures of the spherical refractive surfaces of said lens elements of said corrector lens group, and adjusting spacing between adjacent lens elements of said corrector lens group, as appropriate to provide a specified degree of correction for spherical aberration, coma and chromatic aberration, 8. A telescope of the Cassegrain type comprising:

a) a spherical primary mirror, b) a plurality of lens elements constituting a corrector lens group, and c) a spherical secondary mirror, said secondary mirror being a reflective coating formed on a refractive surface of one of said lens elements of said corrector lens group; said primary and secondary mirrors and said lens elements of said corrector lens group being disposed coaxially with respect to each other along an optic axis; said primary mirror having a specified focal length defining a front focal plane of said primary mirror; means located at said front focal plane of said primary mirror to define an entrance pupil for said telescope; said reflective coating being formed on the refractive surface of the lens element of said corrector lens group closest to said primary mirror along said optic axis so that said reflective coating faces said primary mirror; said primary and secondary mirrors being configured and positioned with respect to each other along said optic axis so that optical power for said telescope is provided by said primary and secondary mirrors, and so that contributions to astigmatism attributable to said primary and secondary mirrors substantially cancel each other so as to leave only an inconsequential residual value of astigmatism for said telescope; said lens elements of said corrector lens group being configured and positioned with respect to each other along said optic axis so that contributions to other remaining geometrical aberrations of said telescope attributable to said primary and secondary mirrors are reduced by said corrector lens group, wherein:

i) said primary and secondary mirrors and said lens elements of said corrector lens group are configured and positioned with respect to each other so that said telescope focuses a distant object to an image plane; and ii) said primary and secondary mirrors and said lens elements of said corrector lens group are configured and positioned with respect to each other so as to have a focal length of approximately 248 millimeters according to a design form as follows:

b) a plurality of lens elements constituting a corrector lens group, and c) a spherical secondary mirror, said secondary mirror being a reflective coating formed on a refractive surface one of said lens elements of said corrector lens group; said primary and secondary mirrors and said lens elements of said corrector lens group being disposed coaxially with respect to each other along an optic axis; said primary mirror having a specified focal length defining a front focal plane of said primary mirror; means located at said front focal plane Of said primary mirror to define an entrance pupil for said telescope; said reflective coating being formed on the refractive surface of the lens element of said corrector lens group closest to said primary mirror along said optic axis so that said reflective coating faces said primary mirror; said primary and secondary mirrors being configured and positioned with respect to each other along said optic axis so that optical power for said telescope is provided by said primary and secondary mirrors, and so that contributions to astigmatism attributable to said primary and secondary mirrors substantially cancel each other so as to leave only an inconsequential residual value of astigmatism for said telescope; said lens elements of said corrector lens group being configured and positioned with respect to each other along said optic axis so that contributions to other remaining geometrical aberrations of said telescope attributable to said primary and secondary mirrors are reduced by said corrector lens group, wherein:

i) said primary and secondary mirrors and said lens elements of said corrector lens group are configured and positioned with respect to each other so that said telescope focuses a distant object to an image plane with a substantially flat field; and ii) said primary and secondary mirrors and said lens elements of said corrector lens group are configured and positioned with respect to each other so as to have a focal length of approximately 158 millimeters

| Surface | | Radius (mm) | Thickness or Separation (mm) | Glass $n_d$ | $V_d$ |
|---|---|---|---|---|---|
| Entrance pupil (25 mm) | | | s = 4.487 | | |
| | $L_1$ | $R_1 = -51.7405$ | t = 1.000 | 1.51009 | 63.46 |
| | | $R_2 = -148.0587$ | | | |
| | | | s = 0.653 | | |
| | $L_2$ | $R_3 = -67.5501$ | t = 1.851 | 1.62004 | 36.37 |
| | | $R_4 = -50.0000$ | | | |
| | | | s = 55.365 | | |
| $M_1$ | | $R_5 = -125.0000$ | | | |
| | | | s = 55.365 | | |
| $M_2$ | | $R_6 = R_4 = -50.0000$ | | | |
| Exit pupil | | | (s = −25.000) | | |
| Image | | | s = 100.000 | | |

9. A telescope of the Cassegrain type comprising:

a) a spherical primary mirror, according to a design form as follows:

| Surface | Radius (mm) | Thickness or Separation (mm) | Glass $n_d$ | $V_d$ |
|---|---|---|---|---|
| Entrance pupil (25 mm) | | s = 51.898 | | |
| $L_1$ { $R_1 = -72.9714$ | | t = 2.000 | 1.43700 | 90.70 |
| $R_2 = -90.5128$ | | s = 1.000 | | |
| $L_2$ { $R_3 = -1262.1112$ | | t = 2.000 | 1.56732 | 42.84 |
| $R_4 = 89.9431$ | | s = 1.000 | | |
| $L_3$ { $R_5 = 90.2546$ | | t = 8.000 | 1.62014 | 63.49 |
| $R_6 = -250.000$ | | s = 1.000 | | |
| $M_1$ | $R_7 = -250.0000$ | s = 50.000 | | |
| $M_2$ | $R_8 = R_6 = -250.0000$ | | | |
| Exit pupil | | (s = -125.000) | | |
| Image | | s = 65.217 | | |

10. A telescope of the Cassegrain type comprising:
 a) spherical primary mirror,
 b) plurality of lens elements constituting a corrector lens group, and
 c) a spherical secondary mirror, said secondary mirror being a reflective coating formed on a refractive surface of one of said lens elements of said corrector lens group; said primary and secondary mirrors and said lens elements of said corrector lens group being disposed coaxially with respect to each other along an optic axis; said primary mirror having a specified focal length defining a front focal plane of said primary mirror; means located at said front focal plane of said primary mirror to define an entrance pupil for said telescope; said reflective coating being formed on the refractive surface of the lens element of said corrector lens group closest to said primary mirror along said optic axis so that said reflective coating faces said primary mirror; said primary and secondary mirrors being configured and positioned with respect to each other along said optic axis so that optical power for said telescope is provided by said primary and secondary mirrors, and so that contributions to astigmatism attributable to said primary and secondary mirrors substantially cancel each other so as to leave only an inconsequential residual value of astigmatism for said telescope; said lens elements of said corrector lens group being configured and positioned with respect to each other along said optic axis so that contributions to other remaining geometrical aberrations of .said telescope attributable to said primary and secondary mirrors are reduced by said corrector lens group, wherein:
 i) said primary and secondary mirror and said lens elements of said corrector lens group are configured and positioned with respect to each other so that said telescope is afocal; and
 ii) said primary and secondary mirrors and said lens elements of said corrector lens group are configured and positioned with respect to each other according to a design form as follows:

| Surface | Radius (mm) | Thickness or Separation (mm) | Glass $n_d$ | $V_d$ |
|---|---|---|---|---|
| Entrance pupil (25 mm) | | s = 18.685 | | |
| $L_1$ { $R_1 = -36.2810$ | | t = 5.359 | 1.62004 | 36.37 |
| $R_2 = -48.5420$ | | s = 1.071 | | |
| $L_2$ { $R_3 = -87.8614$ | | t = 5.359 | 1.51009 | 63.14 |
| $R_4 = -50.0000$ | | s = 42.681 | | |
| $M_1$ | $R_5 = -150.0000$ | s = 42.681 | | |
| $M_2$ | $R_6 = R_4 = -50.0000$ | | | |
| Exit pupil | | (s = -25.000) | | |

11. A telescope of the Cassegrain type comprising a spherical primary mirror and a spherical secondary mirror, and also comprising a plurality of lens elements functioning as a corrector lens group, said telescope being produced by a process characterized in that:
   (A) a specified optical power for said telescope and correction for astigmatism of said mirrors are provided primarily by determining relative positions of said mirrors, said relative positions of said mirrors being substantially independent of relative positions of the lens elements of said corrector lens group, and
   (B) correction for other geometrical aberrations of said telescope is provided primarily by said corrector lens group
said process comprising the steps of:
   a) selecting a design form for a conventional Cassegrain-type telescope having a concave spherical primary mirror and a convex spherical secondary mirror, said primary and secondary mirrors of said conventional Cassegrain-type telescope being coaxially disposed with respect to each other along an optic axis, said concave spherical primary mirror of said conventional Cassegrain-type telescope having a specified focal length defining a front focal plane of said primary mirror, said primary and secondary mirrors of said conventional Cassegrain-type telescope providing said specified optical power, said design form for said conventional Cassegrain-type telescope serving as a "starting design form" with which to begin designing said telescope;
   b) locating an entrance pupil for said telescope at said front focal plane of said concave primary mirror of said conventional Cassegrain-type telescope in said "starting design form";
   c) developing an "intermediate design form" for said telescope by:
      (i) positioning a plurality of lens elements coaxially with respect to each other along said optic axis in said "starting design form", said plurality of lens elements in combination with each Other having negligible optical power, said lens elements functioning as said corrector lens group, all refractive surfaces of said lens elements of said corrector lens group being spherical surfaces;
      (ii) removing said secondary mirror of said conventional Cassegrain-type telescope from said "starting design form"; and
      (iii) providing a reflective coating on a central portion of a refractive surface of the lens element of said corrector lens group that is closest to said concave primary mirror in said "starting design form" so that said reflective coating faces said concave primary mirror, said reflective coating replacing said secondary mirror of said conventional Cassegrain-type telescope that has been removed from said "starting design form", said reflective coating functioning as a secondary mirror for said telescope, said concave primary mirror together with said collector lens group and said reflective coating serving as optical elements of said "intermediate design form";
   d) adjusting separation between said concave primary mirror and said secondary mirror along said optic axis in said "intermediate design form" so as to provide correction for astigmatism of said mirrors, adjustment of the separation between said primary mirror and said secondary mirror introducing a change in optical power for said telescope in said "intermediate design form"; and
   e) adjusting geometrical parameters of said corrector lens group in said "intermediate design form" so as:
      (i) to restore said specified optical power for said telescope, and
      (ii) to correct for other geometrical aberrations of said telescope.

* * * * *